(12) United States Patent
Summer

(10) Patent No.: US 10,090,667 B2
(45) Date of Patent: Oct. 2, 2018

(54) RADIATION HARDENED DC-DC CONVERTER FOR OPERATION AT CRYOGENIC TEMPERATURES

(71) Applicant: Steven E. Summer, Plandome, NY (US)

(72) Inventor: Steven E. Summer, Plandome, NY (US)

(*) Notice: Subject to any disclaimer, the term of this patent is extended or adjusted under 35 U.S.C. 154(b) by 0 days.

(21) Appl. No.: 15/595,190

(22) Filed: May 15, 2017

(65) Prior Publication Data

US 2017/0331277 A1 Nov. 16, 2017

Related U.S. Application Data

(60) Provisional application No. 62/336,984, filed on May 16, 2016.

(51) Int. Cl.
*H02M 3/335* (2006.01)
*H02H 5/00* (2006.01)
*H02H 5/04* (2006.01)
*H02M 3/28* (2006.01)
*H02M 1/00* (2006.01)

(52) U.S. Cl.
CPC .............. *H02H 5/005* (2013.01); *H02H 5/04* (2013.01); *H02M 3/28* (2013.01); *H02M 3/335* (2013.01); *H02M 2001/0045* (2013.01)

(58) Field of Classification Search
CPC .............. H02M 3/42; H02M 3/33507; H02M 3/33523; H02M 3/33569; H02M 3/33592; H02H 5/04; H02H 5/005
USPC .......... 363/16, 21.01–21.18, 45, 56.1, 56.11, 363/56.12, 95, 97, 131
See application file for complete search history.

(56) References Cited

U.S. PATENT DOCUMENTS

| | | | | |
|---|---|---|---|---|
| 4,005,352 A | * | 1/1977 | Kugler | H02M 3/3378 363/16 |
| 5,498,995 A | * | 3/1996 | Szepesi | H02M 3/33507 327/101 |
| 6,456,511 B1 | * | 9/2002 | Wong | H02M 1/36 363/21.13 |
| 6,744,642 B2 | * | 6/2004 | Hung | H02M 1/34 363/21.06 |

OTHER PUBLICATIONS

Magnetic Amplifiers, Theory and Application, by Sidney Platt, Prentice Hall, 1958.
Magnetic Amplifiers, by Dr. Herbert F. Storm, John Wiley and Sons, 1955.

* cited by examiner

*Primary Examiner* — Yemane Mehari
(74) *Attorney, Agent, or Firm* — Feldman Law Group, P.C.; Steven M. Crosby

(57) ABSTRACT

A radiation-hardened DC-DC converter capable of operating at cryogenic temperatures in high radiation environments. The radiation-hardened DC-DC converter can include an input side, the input side producing a high frequency AC voltage; a transformer; and an output side, the output side including a magnetic amplifier, wherein the pre-regulated high frequency AC voltage is fed to the magnetic amplifier through the transformer allowing the magnetic amplifier to provide a pulse width modulation function for voltage regulation.

16 Claims, 5 Drawing Sheets

OVERALL BLOCK DIAGRAM

OVERALL BLOCK DIAGRAM

102

BIAS CIRCUIT

104

UNDER VOLTAGE LOCKOUT
SCHMITT TRIGGER

106

ASTABLE MULTIVIBRATOR

108

LEVEL SHIFTER

RADIATION HARDENED DC-DC CONVERTER FOR OPERATION AT CRYOGENIC TEMPERATURES

CROSS REFERENCE TO RELATED APPLICATION

This application is based on U.S. Provisional Pat. App. Ser. No. 62/336,984, filed on May 16, 2016, now pending. The provisional patent application identified above is incorporated here by reference in its entirety to provide continuity of disclosure.

BACKGROUND

Bipolar transistors, in discrete form and within integrated circuits, are minority carrier devices. Although many parts of these integrated circuits can operate down to −80 or −100 degrees Celsius, at more extreme cold temperatures, the current gain of the bipolar transistors drops to levels that make the integrated circuits functionally unusable.

Majority carrier devices, such as insulated gate MOSFETs and MESFETs as well as junction FETs (JFETs), however, do not have this limitation to such an extent. In fact, the channel resistance of these devices reduces at extreme cold temperature, which can improve performance. Both insulated gate and junction FETs are available as discrete elements or combined into an integrated circuit.

When exposed to ionizing radiation, the gate threshold of insulating gate devices, including CMOS parts, can shift considerably due to accumulation of radiation deposited charge within the gate oxide. Unless special methods are used to compensate for this voltage shift, most commercially available insulating gate devices are not functional after high radiation exposure.

SUMMARY

The purpose of this disclosed technology is to implement electronic circuits used in planetary exploration applications. These electronic circuits are capable of operating at cryogenic temperatures (such as, at or below 120K) and can withstand large amounts of ionizing radiation. Further, due to power limitations in planetary exploration vehicles, these electronic circuits can be highly efficient with low quiescent current consumption and low drop out characteristics. Specifically, the purpose of this disclosed technology is to implement a radiation hardened DC-DC converter that can operate at extremely low temperatures, such as −150 to −190 Celsius or below.

A benefit of this disclosed technology is that it is implemented with industry standard discrete parts, as opposed to using specially designed integrated circuits. This allows the DC-DC converter of the disclosed technology to be produced at relatively low cost and capable of operating in planetary exploration applications. For example, conventional P-channel MOSFETs are usable at high radiation levels because the shift in gate threshold voltage as radiation exposure increases the gate threshold voltage. Therefore, a conventional P-channel MOSFETs is usable in radiation environments provided a correspondingly high gate voltage is used.

A preferred embodiment of this disclosed technology uses a combination of JFETs, P-channel MOSFETs combined with a saturable core magnetic amplifier to realize a low cost radiation hardened DC-DC converter suitable for operation at cryogenic temperatures. Therefore, eliminating the need for bipolar transistors.

In one implementation, a radiation-hardened DC-DC converter for operating at cryogenic temperatures in high radiation environments can comprise: an input side, the input side producing a high frequency AC voltage; a transformer; and an output side, the output side including a magnetic amplifier, wherein the pre-regulated high frequency AC voltage is fed to the magnetic amplifier through the transformer allowing the magnetic amplifier to provide a pulse width modulation function for voltage regulation.

In some implementations, the pre-regulated high frequency AC voltage can optimize a regulation performance and efficiency of the magnetic amplifier. In some implementations, the output side can convert the high frequency AC voltage received from the transformer into a regulated DC voltage. In some implementations, a DC input voltage can be fed to the input side. In some implementations, the DC input voltage can be ~28 VDC. In some implementations, the input side can include a bias and reference circuit, an undervoltage lockout Schmitt trigger, an RC astable multivibrator and a level shifter.

In some implementations, the undervoltage lockout Schmitt trigger can prevent a DC-DC converter output when the input voltage is below a specified value. In some implementations, the undervoltage lockout Schmitt trigger can apply an input voltage with a hysteresis characteristic when the voltage exceeds preset levels. In some implementations, the undervoltage lockout Schmitt trigger can use at least one P-channel MOSFET device, wherein a gate drive of the at least one P-channel MOSFET device is driven at a high level in order for the at least one P-channel MOSFET device to become saturated.

In some implementations, the RC astable multivibrator can produce an astable multivibrator output in an almost symmetrical square wave operating at a frequency between 20 kHz and 100 kHz.

In some implementations, the level shifter can invert the astable multivibrator output and can produce a low impedance drive signal. In some implementations, the DC-DC converter can further comprise: a power switching P-channel MOSFET for driving the transformer.

In some implementations, the transformer can include at least a primary winding, a reset winding and an output winding. In some implementations, the transformer can include a bias power winding which supplies bias power to a control and regulation circuitry on the output side. In some implementations, the magnetic amplifier can be a saturable core magnetic amplifier.

In some implementations, the DC-DC converter can further comprise: an error amplifier and voltage reference for comparing an output of the DC-DC converter to a reference voltage and producing a reset current for the saturable inductor that allows the output to be proportional to the reference voltage.

The advantages of the disclosed technology are that neither a switched JFET driver nor a magnetic amplifier in standalone applications could achieve deep space application requirements. Specifically, (1) a JFET driver would require bipolar components unusable in cryogenic temperatures and high-radiation environments and (2) a magnetic amplifier would not receive a pre-regulated high frequency AC voltage allowing the magnetic amplifier to provide a pulse width modulation function for voltage regulation. The disclosed technology, however, achieves the goals by using the astable multi output with a feed forward principle to effectively pre-regulate a constant volt product to a magnetic amplifier. The combination of the disclosed technology using industry standard discrete parts, as opposed to using specially designed integrated circuits, achieves functions in deep space applications at relatively low cost.

DETAILED DESCRIPTION

Figure 1:
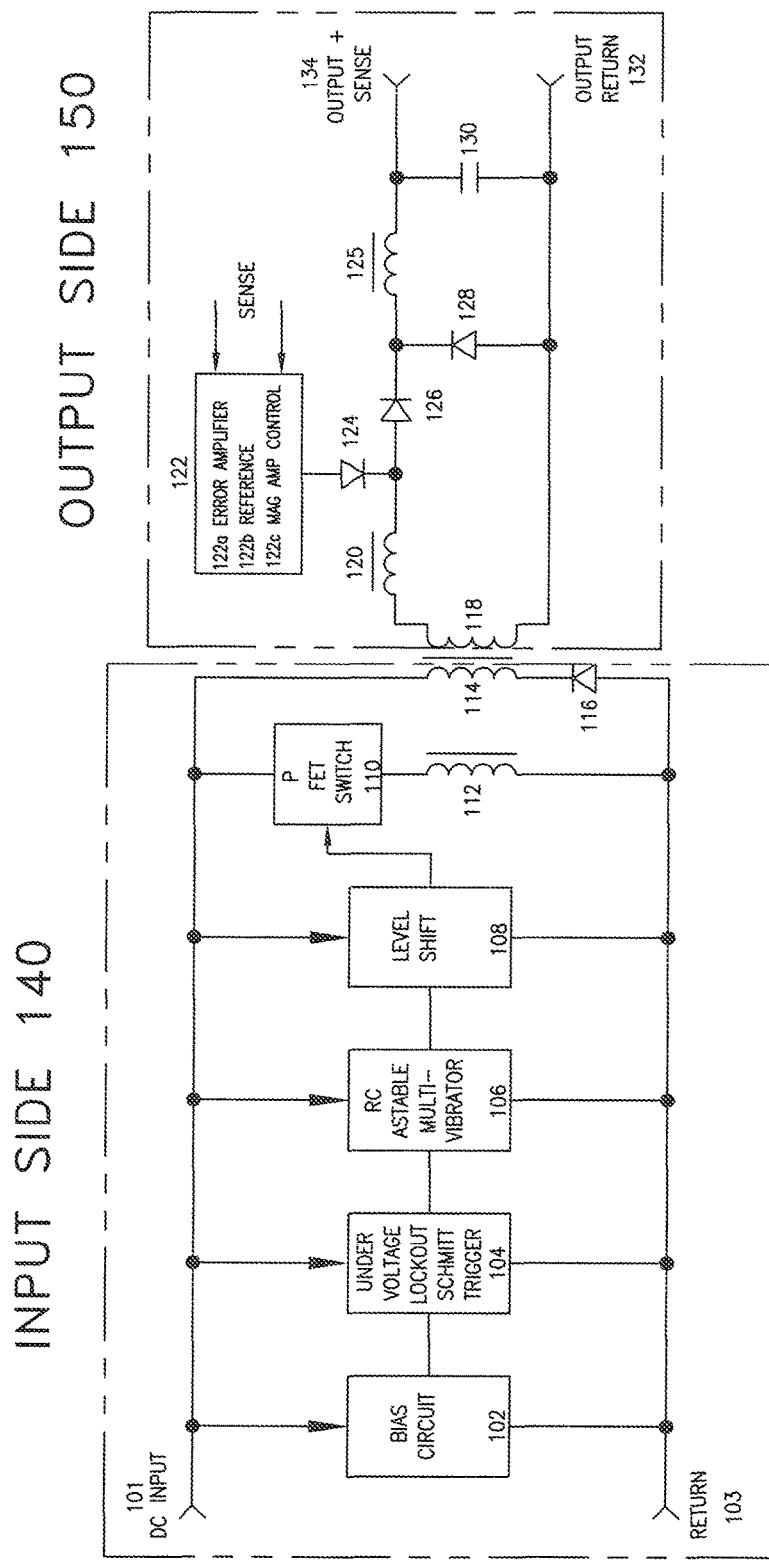
FIG. 1 is a block diagram of a radiation hardened DC-DC converter of the disclosed technology.

As shown in the block diagram of FIG. 1, a DC input voltage 101, e.g. ~28 VDC, can feed a DC-DC converter 100 that includes: (1) an input side bias and reference circuit 102 (shown in FIG. 2), (2) an undervoltage lockout Schmitt trigger 104 (shown in FIG. 3), (3) an RC astable multivibrator 106 (shown in FIG. 4), (4) a level shifter 108 (shown FIG. 5), as well as, (5) a P FET power switch 110, (6) a transformer 112, 114, 118, (7) a magnetic amplifier square loop inductor 120, (8) output rectifiers 128, (9) smoothing filter 130 and (10) a controller 122, the controller including an error amplifier function 122a, voltage reference function 122b and a magnetic amplifier function 122c.

Conventional radiation hardened DC-DC converters that normally operate at extremely low temperatures require input to output galvanic isolation. Functionally, these conventional DC-DC converters have an input side and an output side where the voltage at the output side is sensed and a feedback signal is transmitted from the output side to the input side to effect regulation.

In the DC-DC converter 100 of the disclosed technology, the input side 140 can generate an unregulated square wave but other more complex waves can be utilized. Voltage regulation can be accomplished on the output side 150 by using a saturable core magnetic amplifier 120, which provides a pulse width modulation function.

One of the primary purposes of the input side 140 of the DC-DC converter 100 is to produce a pre-regulated high frequency AC voltage that can be coupled to the output side 150 using a transformer 114.

Figure 2:
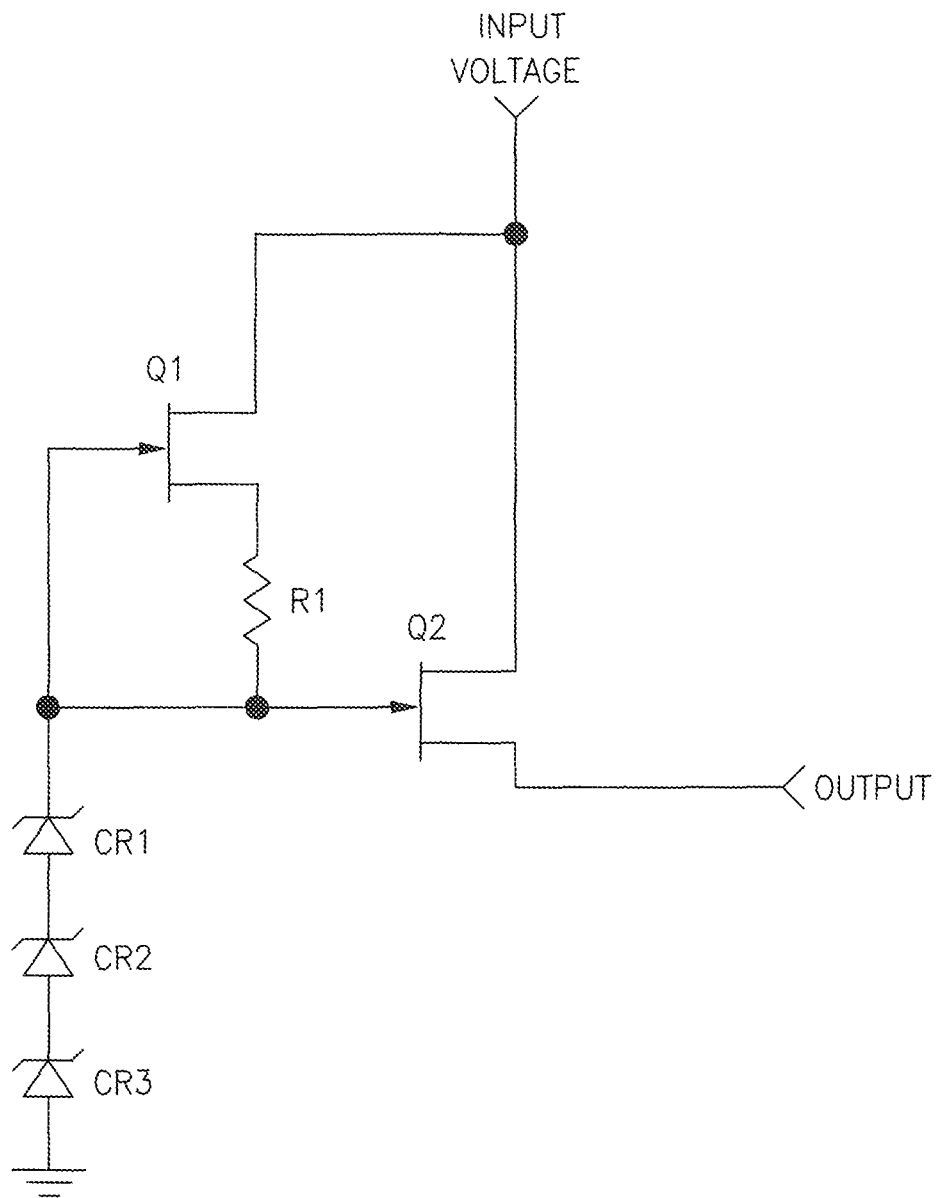
FIG. 2 is a circuit diagram of a bias circuit for the DC-DC Converter shown in FIG. 1.

Reviewing components of the input side 140, FIG. 2 shows the bias and reference circuit 102. In FIG. 2. JFET Q1 acts as a constant current source, feeding current to a zener diode string CR1, CR2, CR3. Resistor R1 is used to adjust the magnitude of the constant current. The zener diode string CR1, CR2, CR3 may use a series of zener diodes whose voltage breakdown remains at a relatively constant voltage temperature coefficient (typically 5.1 VDC). Alternatively, some or all of the zener diodes may be temperature compensated because they consist of a 5.6 VDC zener diode in series with a forward biased silicon diode.

The type of voltage reference device usually preferred at higher temperatures, the band gap reference, couldn't be used because of the bipolar transistor current gain degradation. JFET Q2 is a source follower that reduces the output impedance of this stage.

Figure 3:
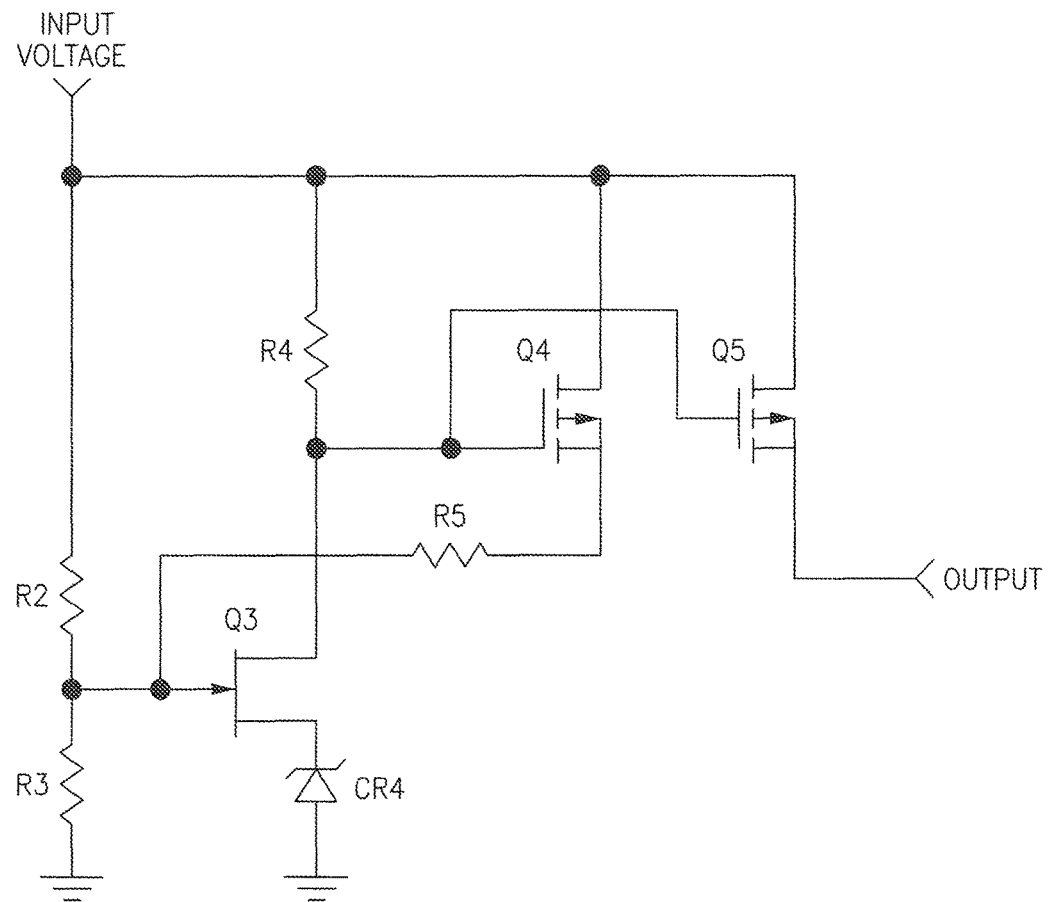
FIG. 3 is a circuit diagram of a undervoltage lockout Schmitt trigger for the DC-DC Converter shown in FIG. 1.

FIG. 3 shows the undervoltage lockout Schmitt trigger 104. The purpose of this circuit block is to prevent DC-DC Converter output when the input voltage is below specified values and to apply the input voltage with a hysteresis characteristic when the voltage exceeds preset levels. This circuit 104, as well as the power switching stage, uses P-channel MOSFET devices. In order for these devices to function properly at high radiation levels, the gate drive must be at a relatively high level. Without an undervoltage function, the gate drive may be starved, causing the P-channel MOSFETs to operate in the linear region instead of being saturated.

In addition, the input power source may have a slow rise time. This could prevent the astable multivibrator from starting. Because the Schmitt trigger circuit has regenerative action when active, a relatively fast rise time is produced.

Referring to FIG. 3, R2 and R3 form a voltage divider connected to the input voltage. JFET Q3 is the sensing device. The source of Q3 is connected to ground through zener diode CR4. This provides a reverse bias for the gate of Q3, so that it is normally off at low input voltage.

Resistor R4 is a pull up between the Q3 drain and the input voltage. The drain of Q3 drives two P-channel MOSFETs. A relatively small device, Q4, provides a regenerative hysteresis current to the gate of Q3 when the input voltage exceeds the desired preset amount. A larger MOSFET Q5 connects the input voltage to all the remaining input side circuits.

Figure 4:
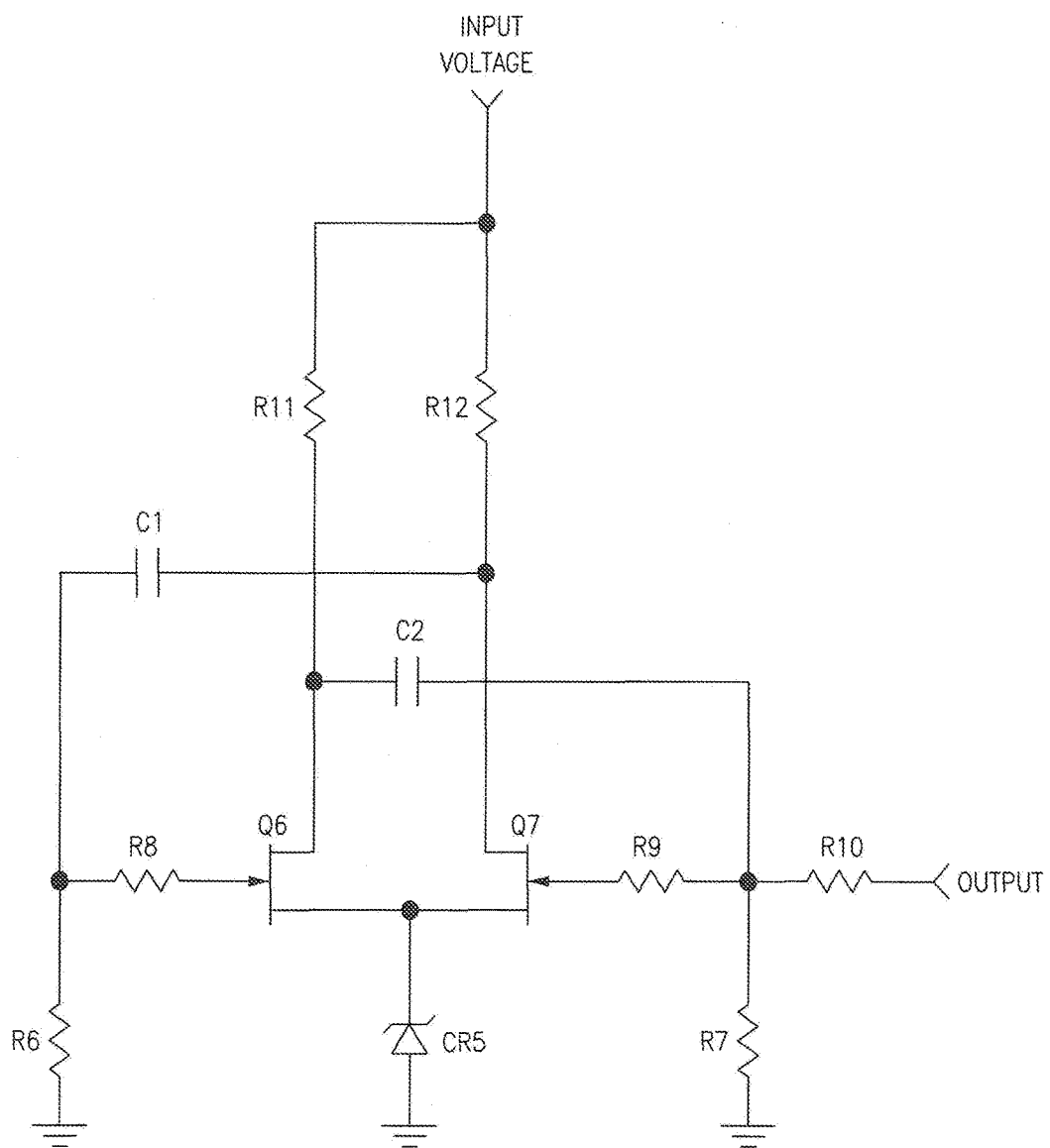
FIG. 4 is a circuit diagram of an astable multi-vibrator for the DC-DC Converter shown in FIG. 1.

FIG. 4 shows the astable multivibrator 106. A square wave pre-regulation drive signal for switching the output P-channel MOSFET is derived from an astable multivibrator using JFETs Q6 and Q7. The oscillation frequency is principally determined by R6-C1 and R12-C2. R11 and R12 are pull-up resistors. R8 and R9 limit JFET gate current when the gate is forward biased. Because JFETs Q6 and Q7 would be normally on at low gate to source voltages, reverse bias is provided by zener diode CR5.

The output signal is fed through resistor R10. The desired output is an almost symmetrical square wave operating at a frequency between 20 kHz and 100 kHz. The actual frequency is fixed, and the choice of the frequency depends on the DC-DC converter output power level as well as the implementation of the output magnetic amplifier. The output signal of the input side 140 pre-regulates a relatively constant volt second product to the transformer using a feed forward principle thereby reducing the regulation demand of the magnetic amplifier.

The RC circuit parameters are slightly unbalanced so that the drive waveform has slightly less than 50% duty cycle. This duty cycle allows proper functioning of the output stage.

Figure 5:
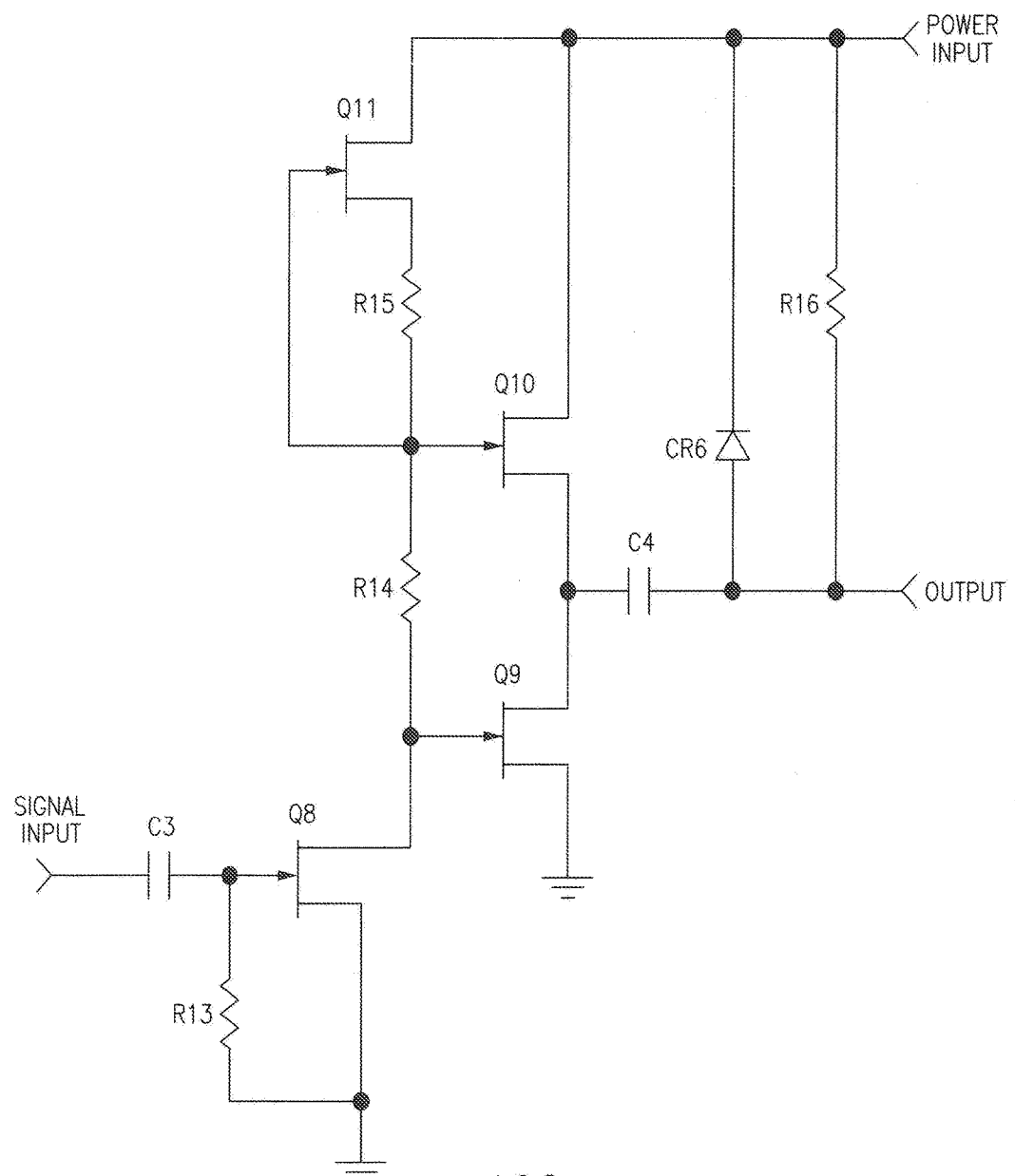
FIG. 5 is a circuit diagram of a level shifter shown in FIG. 1.

FIG. 5 shows the level shifter 108. The function of this circuit block is to invert the astable multivibrator output and produce a low impedance drive signal referred to the positive input voltage.

Pulse input in the range of 20 kHz to 100 kHz is fed through capacitor C3 to JFET Q8. Resistor R13 provides a gate bleeder. JFET Q8 drives a source load. This consists of current source JFET Q11 and R15, and the gates of JFETs Q9 and Q10. Q8 and Q9 are N polarity JFETs, whereas Q10 is a P polarity JFET. The purpose of R14 is to bias the gates of Q9 and Q10 for closer conduction points.

JFETs Q9 and Q0 form a complementary buffer that lowers the source impedance of the signal produced at the drain of JFET Q8. The buffer output is capacitively coupled through C4 and DC restored by diode CR6. R16 is a gate bleeder resistor for the power switching P-channel MOSFET 110.

The power switching P-channel MOSFET 110 drives a transformer with at least three windings, comprising a primary winding 112, a reset winding 114 and an output winding 118. If needed, it may also contain a fourth winding 125 which supplies bias power 134 to the control and regulation circuitry 122.

The reset winding 114 has the same number of turns as the primary winding 112. When the power switching P-channel MOSFET 110 switches off, the diode 116 in series with the reset winding 114 conducts and limits the voltage across the power switching P-channel MOSFET 110 as well as allowing the flux in the output winding 118 to reset.

The purpose of the output side 150 of the radiation hardened DC-DC converter 100 is to allow the radiation hardened DC-DC converter 100 to operate at extremely low temperatures and to convert an AC waveform into a well-regulated DC voltage. This regulation is accomplished through the use of the controller 122 controlling a magnetic amplifier. That is, the magnetic amplifier provides a pulse width modulation that modifies an average rectified DC voltage produced by the input side 140. Since the input to the magnetic amplifier is pre-regulated by the astable multivibrator, regulation characteristics and efficiency of the magnetic amplifier are enhanced.

For background, magnetic amplifier regulation was a method popular in the 1950's, but rarely used today because other regulation means became more popular. However, saturable core magnetic regulation was ideal for this application because it allows simple pulse width modulation and is inherently impervious to extreme temperatures and radiation levels.

As shown in FIG. 1, a saturable square loop core inductor 120 is in series between the output side transformer windings 118 and the series-shunt output rectifiers 126, 128. When the anode voltage of the series rectifier goes negative, a reset current is applied to the series combination of the magnetic amplifier core and the output side transformer windings 118.

By controlling the volt-seconds applied to the saturable square loop core inductor 120, the impedance of the core's winding may be also controlled. This produces a pulse width modulation capability.

The AC signal produced by the DC-DC converters input side can thus be pulse width modulated, rectified and filtered to achieve a well-regulated output voltage.

Output control of the saturable square loop core inductor 120 is implemented with a stable output side reference voltage, preferably using a temperature compensated zener diode, then feeding an operational amplifier, constructed with N and P type JFETs. The actual control current is applied through a P-channel MOSFET, which has a sufficiently high voltage rating to withstand the negative voltages produced at the transformer secondary.

The output side error amplifier and voltage reference compare the DC-DC converter output to the reference voltage, and then produce a reset current for the saturable square loop core inductor 120 that allows the output to be proportional to the reference voltage.

The foregoing Detailed Description is to be understood as being in every respect illustrative and exemplary, but not restrictive, and the scope of the disclosed technology disclosed herein is not to be determined from the Detailed Description, but rather from the claims as interpreted according to the full breadth permitted by the patent laws. It is to be understood that the embodiments shown and described herein are only illustrative of the principles of the disclosed technology and that various modifications may be implemented by those skilled in the art without departing from the scope and spirit of the disclosed technology. Those skilled in the art could implement various other feature combinations without departing from the scope and spirit of the disclosed technology. Although the embodiments of the present disclosure have been described with specific examples, it is to be understood that the disclosure is not limited to those specific examples and that various other changes, combinations and modifications will be apparent to one of ordinary skill in the art without departing from the scope and spirit of the disclosed technology which is to be determined with reference to the following claims.

The invention claimed is:

1. A radiation-hardened DC-DC converter for operating at cryogenic temperatures comprising:
   an input side, the input side includes a bias and reference circuit, an undervoltage lockout Schmitt trigger, an RC astable multivibrator and a level shifter, the input side producing a pre-regulated high frequency AC voltage;
   a transformer: and
   an output side, the output side including a magnetic amplifier,
   wherein the pre-regulated high frequency AC voltage is fed to the magnetic amplifier through the transformer allowing the magnetic amplifier to provide a pulse width modulation function for voltage regulation.

2. The DC-DC converter of claim 1 wherein the pre-regulated high frequency AC voltage optimizes a regulation performance and efficiency of the magnetic amplifier.

3. The DC-DC converter of claim 1 wherein the output side converts the pre-regulated high frequency AC voltage received from the transformer into a regulated DC voltage.

4. The DC-DC converter of claim 1 wherein a DC input voltage is fed into the input side.

5. The DC-DC converter of claim 4 wherein the DC input voltage is ~28 VDC.

6. The DC-DC converter of claim 1 wherein the undervoltage lockout Schmitt trigger prevents a DC-DC converter output when the input voltage is below a specified value.

7. The DC-DC converter of claim 1 wherein the undervoltage lockout Schmitt trigger applies an input voltage with a hysteresis characteristic when the input voltage exceeds a preset level.

8. The DC-DC converter of claim 1 wherein the undervoltage lockout Schmitt trigger uses at least one P-channel MOSFET device, wherein a gate drive of the at least one P-channel MOSFET device is driven at a high level in order for the at least one P-channel MOSFET device to become saturated.

9. The DC-DC converter of claim 1 wherein the RC astable multivibrator produces an astable multivibrator output in an almost symmetrical square wave operating at a frequency between 20 kHz and 100 kHz to pre-regulate a relatively constant volt second product to the magnetic amplifier coupled to the transformer.

10. The DC-DC converter of claim 9 wherein the level shifter inverts the astable multivibrator output and produces a low impedance drive signal.

11. The DC-DC converter of claim 1 further comprising:
    a power switching P-channel MOSFET for driving the transformer.

12. The DC-DC converter of claim 11 wherein the transformer includes at least a primary winding, a reset winding and an output winding.

13. The DC-DC converter of claim 12 wherein the transformer includes a bias power winding which supplies bias power to a control and regulation circuitry on the output side.

14. The DC-DC converter of claim 1 wherein the magnetic amplifier is a saturable core magnetic amplifier.

15. The DC-DC converter of claim 14 further comprising:
an error amplifier and voltage reference circuit for comparing an output of the DC-DC converter to a reference voltage and producing a reset current for the saturable inductor that allows the output to be proportional to the reference voltage.

16. The DC-DC converter of claim 1 wherein cryogenic temperatures are below −190° C.

* * * * *